(12) United States Patent
Ingram et al.

(10) Patent No.: US 11,408,991 B2
(45) Date of Patent: *Aug. 9, 2022

(54) TAILORING SENSOR EMISSION POWER TO MAP, VEHICLE STATE, AND ENVIRONMENT

(71) Applicant: Waymo LLC, Mountain View, CA (US)

(72) Inventors: Benjamin Ingram, Santa Clara, CA (US); Edward McCloskey, Los Gatos, CA (US); Timothy Campbell, Los Angeles, CA (US); Pierre-Yves Droz, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/110,762

(22) Filed: Dec. 3, 2020

(65) Prior Publication Data

US 2021/0088647 A1 Mar. 25, 2021

Related U.S. Application Data

(63) Continuation of application No. 15/917,184, filed on Mar. 9, 2018, now Pat. No. 10,884,115.

(51) Int. Cl.
*G01S 13/86* (2006.01)
*G01S 13/931* (2020.01)
(Continued)

(52) U.S. Cl.
CPC .......... *G01S 13/865* (2013.01); *G01S 13/931* (2013.01); *G01S 17/86* (2020.01); *G01S 17/931* (2020.01)

(58) Field of Classification Search
CPC ...... G01S 13/865; G01S 17/931; G01S 17/86; G01S 13/931; G01S 13/86; G01S 2013/9327

See application file for complete search history.

(56) References Cited

U.S. PATENT DOCUMENTS 9,720,072 B2   8/2017   McCloskey et al.
9,720,412 B1   8/2017   Zhu et al.
(Continued)

FOREIGN PATENT DOCUMENTS

DE       10360890       7/2005
DE       102007046648   4/2009
(Continued)

OTHER PUBLICATIONS

European Patent Office, Extended European Search Report dated Apr. 12, 2021, issued in connection with European Patent Application No. 19764710.0, 11 pages.

(Continued)

*Primary Examiner* — Mamadou L Diallo
(74) *Attorney, Agent, or Firm* — McDonnell Boehnen Hulbert & Berghoff LLP

(57) ABSTRACT

The present disclosure relates to systems and methods that facilitate active sensor systems. An example method includes receiving information indicative of an operating context of a vehicle, wherein at least one Light Detection and Ranging (LIDAR) sensor or at least one radar sensor are coupled to the vehicle. The method also includes selecting, from a plurality of sensor power configurations, a desired sensor power configuration based on the operating context of the vehicle. The method further includes causing at least one of: the at least one LIDAR sensor to emit light pulses according to the desired sensor power configuration or the at (Continued)

least one radar sensor to emit radar energy according to the desired sensor power configuration.

20 Claims, 10 Drawing Sheets

(51) Int. Cl.
  *G01S 17/86* (2020.01)
  *G01S 17/931* (2020.01)

(56) References Cited

U.S. PATENT DOCUMENTS

| | | | |
|---|---|---|---|
| 9,733,348 | B2 | 9/2017 | Gazit et al. |
| 9,841,763 | B1 | 12/2017 | Valois |
| 2008/0169965 | A1 | 7/2008 | Minichshofer |
| 2016/0061935 | A1 | 3/2016 | McCloskey et al. |
| 2017/0153319 | A1* | 6/2017 | Villeneuve ............ G01S 7/4804 |
| 2017/0168146 | A1 | 6/2017 | Boehmke |
| 2017/0307751 | A1* | 10/2017 | Rohani ................ G01S 13/865 |
| 2017/0329327 | A1 | 11/2017 | Trigui et al. |
| 2018/0009441 | A1 | 1/2018 | Valois |
| 2018/0288320 | A1* | 10/2018 | Melick .................... G01S 17/86 |
| 2019/0258251 | A1* | 8/2019 | Ditty .................. G06K 9/00805 |
| 2019/0293760 | A1* | 9/2019 | Koda ..................... G01S 7/484 |

FOREIGN PATENT DOCUMENTS

| | | |
|---|---|---|
| JP | H07-167958 | 7/1995 |
| JP | 2002-539434 | 11/2002 |
| JP | 2007-139594 | 6/2007 |
| JP | 2010-048716 | 3/2010 |
| JP | 2010-526318 | 7/2010 |
| JP | 2010286962 | 12/2010 |
| JP | 2013-061797 | 4/2013 |
| JP | 2017-529525 | 10/2017 |
| KR | 20180000672 | 1/2018 |
| WO | 2002/095440 | 11/2002 |
| WO | 2012/061376 | 5/2012 |

OTHER PUBLICATIONS

International Searching Authority, International Search Report and Written Opinion dated Jun. 17, 2019, issued in connection with International Patent Application No. PCT/US2019/020357, filed on Mar. 1, 2019, 10 pages.

Japanese Patent Office, Notice of Reasons for Rejection dated Aug. 3, 2021, issued in connection with Japanese Patent Application No. 2020-544472, 13 pages.

* cited by examiner

TAILORING SENSOR EMISSION POWER TO MAP, VEHICLE STATE, AND ENVIRONMENT

CROSS REFERENCE TO A RELATED APPLICATION

The present application is a continuation of U.S. patent application Ser. No. 15/917,184, filed Mar. 9, 2018, the content of which is herewith incorporated by reference.

BACKGROUND

Active sensors include devices that emit energy, which can reflect off environmental surroundings and can be measured upon return to the device. Active sensors include radar and LIDAR, among others. Such active sensors may be utilized in areas such as autonomous or semi-autonomous vehicles, robotics, mapping, and security applications.

SUMMARY

The present disclosure generally relates to light detection and ranging (LIDAR) and radio detection and ranging (RADAR or radar) systems, which may be configured to obtain information about an environment. Such LIDAR and radar devices may be implemented in vehicles, such as autonomous and semi-autonomous automobiles, trucks, motorcycles, and other types of vehicles that can move within their respective environments.

In a first aspect, a system is provided. The system includes a vehicle. The vehicle includes at least one of: a LIDAR sensor coupled to the vehicle or a radar sensor coupled to the vehicle. The system includes a controller, configured to execute instructions so as to carry out operations. The operations include receiving information indicative of an operating context of the vehicle. The operations also include selecting, from a plurality of sensor power configurations, a desired sensor power configuration based on the operating context of the vehicle. The operations further include causing at least one of: the at least one LIDAR sensor to emit light pulses according to the desired sensor power configuration or the at least one radar sensor to emit radar energy according to the desired sensor power configuration.

In a second aspect, a method is provided. The method includes receiving information indicative of an operating context of a vehicle. At least one LIDAR sensor or at least one radar sensor are coupled to the vehicle. The method also includes selecting, from a plurality of sensor power configurations, a desired sensor power configuration based on the operating context of the vehicle. The method further includes causing at least one of: the at least one LIDAR sensor to emit light pulses according to the desired sensor power configuration or the at least one radar sensor to emit radar energy according to the desired sensor power configuration.

Other aspects, embodiments, and implementations will become apparent to those of ordinary skill in the art by reading the following detailed description, with reference where appropriate to the accompanying drawings.

DETAILED DESCRIPTION

Figure 1:
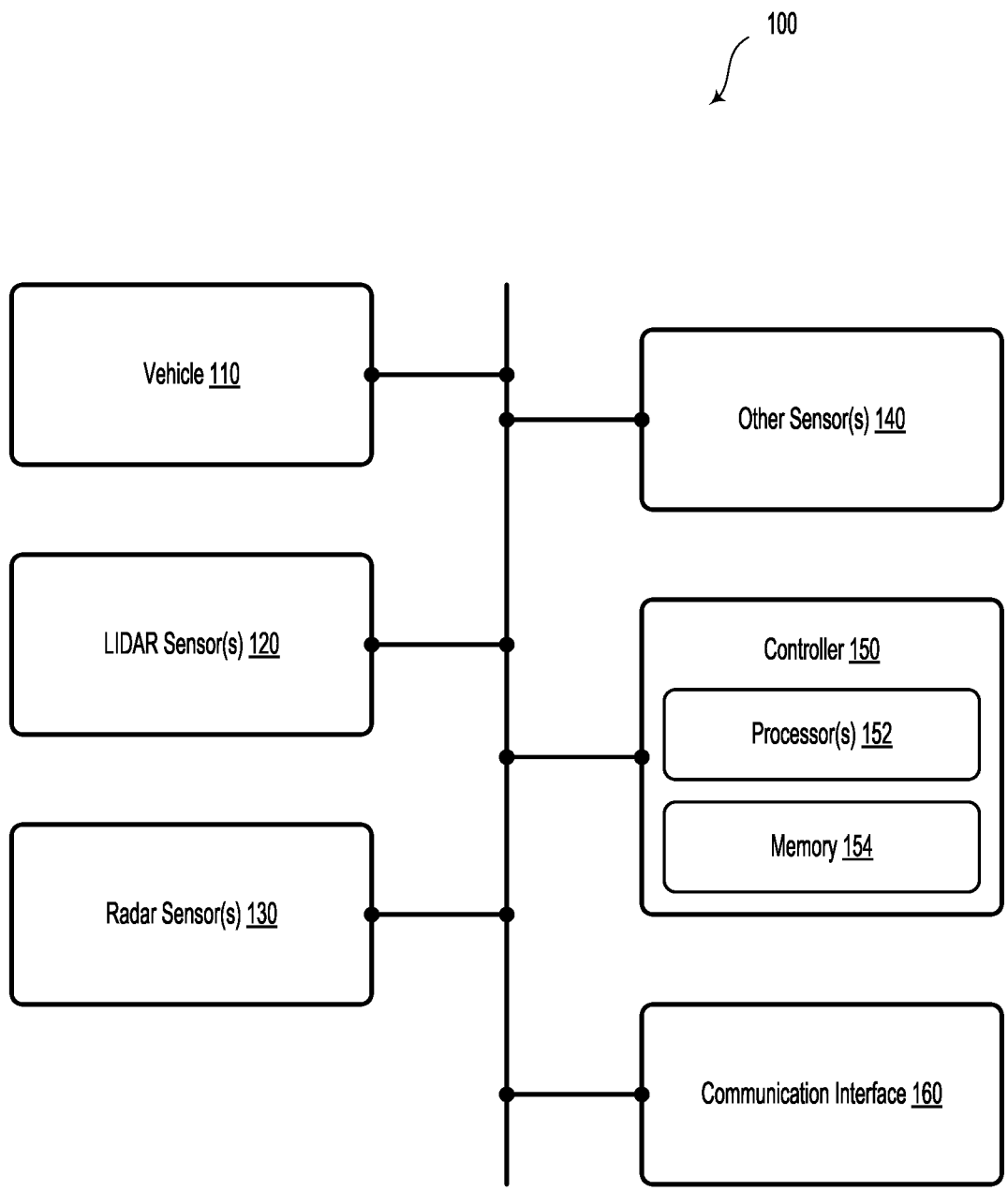
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The design of active sensor systems may involve application-specific and/or context-specific trade-offs between sensor field of view and sensor range. Field of view is important because, for some applications, relevant targets could be present at any azimuth. Range is important because object detection at a distance is generally desirable, especially when there may be a significant velocity difference between the object and the sensor.

Within the context of autonomous or semi-autonomous vehicles, it is often desirable to have both a wide field of view and a long sensor range. For example, a vehicle moving at highway speeds should be able to sense stopped traffic far ahead in the same lane or adjacent lanes. Similarly, a slowly-traveling vehicle changing lanes (e.g., into an exit lane or high-occupancy vehicle lane) should be able to sense fast oncoming traffic from the rear. Yet further, vehicles making an unprotected turn at an intersection without a dedicated turn arrow should be able to sense quickly-approaching traffic from multiple directions. Another example includes a vehicle merging into highway traffic from an on-ramp or cloverleaf ramp. Other driving scenarios with large relative speed differences between vehicles/objects (and a corresponding desirability to discern fast-moving objects at a distance) are contemplated herein.

Many of these driving examples can beneficially use a ~200 meter or greater sensor range. Furthermore, because roadway intersection angles vary and roads can curve substantially, a long sensor range over the full 360 degrees of azimuth can be desirable.

However, it may be challenging to achieve both a wide field of view and long sensor range simultaneously. One source of this trade-off may be the desire to limit average sensor power, e.g., to make emitter or device cooling feasible, to ease physical integration of the cooling system into the platform, to fit within the electrical capabilities (e.g. alternator capability) or cooling capabilities (e.g. radiator capability) of the platform, and/or to minimize effects on fuel economy. Required power is a function of the range squared ($P\alpha r^2$) for the narrow optical beams typical of LIDARs and of the range to the fourth power ($P\alpha r^4$) for the wider beams typical of radars. Accordingly, limited sensor power can be directed over a wide field of view, but then a long range might not be possible. Alternatively, long range may be achieved by directing energy over a small field of view.

Computation capacity can also cause a trade-off between field of view and range. That is, a sensor resolution and/or a sensor field of view may be limited by the amount of presently-available computing resources (e.g., memory, communication bandwidth, computational bandwidth, etc.).

Fortunately, in many situations, long sensor range is usually not needed in all directions at the same time. Accordingly, a sensor system may be designed to dynamically direct high power in the directions where longer sensing range is needed and lower or no power in the directions where less range is required. For example, again in the context of autonomous or semi-autonomous vehicles, when a vehicle is not at an intersection, high amounts of sensor power need not be necessarily directed to the sides of the vehicle. When a vehicle is traveling quickly (e.g., at highway speeds), high sensor power can be directed ahead, not behind, generally giving priority to detecting an environment ahead of the vehicle. When a vehicle is waiting at a traffic light to make an unprotected turn across oncoming traffic, high sensor power can be directed ahead when the light is a green, but can perhaps be operated at a default level when the light is red. These are some examples of tailoring the sensor emission power to the map, the vehicle state, and the environment.

In a system involving multiple sensors on the same vehicle, this sensor emission tailoring can take place at the individual sensor level, where each sensor only illuminates part of its field of view with high power, at the vehicle level where some sensors emit high power while others emit low or no power, or using any other combination or grouping of sensors. In some scenarios, tailoring only at the vehicle level may address vehicle level issues, like platform electrical or cooling limits, while tailoring at the sensor level can also address sensor issues (e.g. emitter cooling or computation).

Within the context of a radar-equipped vehicle, the vehicle could include several radar sensors (e.g., 4-10 radar sensor units). In such a scenario, each of the radar sensors could illuminate a respective field of view by sequentially energizing one of a plurality of transmit beams (e.g., 2-6 transmit beams, each having a 15-30 degree beam spread). Other ways to illuminate the respective field of view using the transmit beams are contemplated (e.g., simultaneous illumination with all transmit beams, even/odd transmit beam schedules, etc.).

In some example embodiments, increased radar sensor range may be desirable in some particular driving scenarios and/or in an effort to sense particular objects (e.g., motorcycles and/or pedestrians). For example, for a front-facing radar sensor unit may include four transmit beams (Beams 1-4), which could be illuminated in a serial fashion in a first mode of operation (e.g., Beam 1, then Beam 2, then Beam 3, then Beam 4, and repeat). In a second mode of operation, illuminating only two of the four transmit beams (e.g., Beam 1, then Beam 2, and repeat) could double the power delivered to the approaching roadway and increase range by about 20% ($2^{1/4} \approx 1.19$). In a third mode of operation, by illuminating one of the four transmit beams (e.g., Beam 1 only), power delivered to the approaching roadway could be quadrupled and the range could be increased by approximately 40% ($4^{1/4} \approx 1.414$).

In some embodiments, reducing the overall power consumption of the radar sensor system may be desirable. Such reductions in power consumption may be achieved by performing sensor-level and/or vehicle-level radar emission power tailoring as described herein.

For example, when a vehicle is not at an intersection, side-facing radars could be turned off or their emission power could be reduced. Additionally or alternatively, while driving quickly (e.g., at highway speeds or above a predetermined threshold speed), rear-facing radars could be turned off or their emission power could be reduced. In such scenarios, other sensor systems (e.g., LIDAR and/or cameras) could be utilized to cover the environmental regions in which less radar power is emitted. Yet further, in some scenarios, some sensor systems or beams need not be scanned or otherwise utilized (e.g., completely powered off or in a standby mode). That is, in such scenarios, some elevation or aziumuthal angle ranges may be less-important and/or be covered by other sensor systems. For example, when driving slowly (e.g., below a predetermined threshold speed) or in certain environments, front-facing radars could be turned off or their emission power could be reduced. By utilizing such techniques, power consumption of the radar sensor system could be reduced by half or more.

In the context of a LIDAR-equipped vehicle, a plurality of light emitters could be arranged such that each light emitter emits light along a respective elevation angle. In such scenarios, the plurality of light emitters could be rotated about a rotational axis (e.g., a vertical axis) to provide coverage over the full 360 degree azimuthal angle range.

In some embodiments, it may be desirable to reduce the overall power dissipation of the LIDAR sensor system. Accordingly, using systems and methods described herein, the light pulse and/or shot power could be adjusted or varied as a function of azimuth angle. For example, when driving above a predetermined threshold velocity, full power could be provided to light pulses emitted within a forward-facing 20-30 degree cone, which may provide full sensing range (e.g., ~200 meters or greater) within that front-facing cone. In such a scenario, 45% power could be provided within a rear-facing 20-30 degree cone, which could provide approximately ⅔ of the maximum sensing range (e.g., ~133 meter effective range, or ~100-150 meter range) within the rear-facing cone. Furthermore, 10% power could be provided to the sides, which may reduce effective sensing range by approximately ⅓ (e.g., ~66 meter effective range, or ~30-100 meter range) to the sides. Such LIDAR power emission tailoring as a function of azimuth angle could reduce average power consumption of a LIDAR sensor system by 80% or more.

In some embodiments, certain sectors (e.g., spatial areas or volumes) within the environment of the vehicle could be rank ordered or prioritized based on an operating context of the vehicle. Relatively low priority sectors may receive less laser emission power or radar emission power (e.g., scanned less frequently, lower spatial resolution, and/or lower average pulse power). Meanwhile, high priority sectors may receive relatively greater laser emission power and/or radar emission power (e.g., scanned relatively more frequently, higher spatial resolution, and/or higher average pulse power).

II. Example Systems

FIG. 1 illustrates a system 100, according to an example embodiment. System 100 may describe at least a portion of a semi- or fully-autonomous vehicle (e.g., a self-driving car). That is, in some embodiments, the system 100 may be incorporated into an autonomous or semi-autonomous vehicle, such as vehicle 300 as illustrated and described in reference to FIGS. 3 and 4A-4D.

The system 100 includes a vehicle 110. The vehicle 110 could include, among other examples, a car, a truck, a bus, a forklift, a recreational vehicle, a mobile robot, a boat, an aerial vehicle, or another type of system configured to sense a given environment and navigate within it.

In example embodiments, at least one Light Detection and Ranging (LIDAR) sensor 120 could be coupled to the vehicle 110. In some embodiments, the LIDAR sensor(s) 120 could include a transmit block and a receive block. The transmit block could include, for example, laser diodes, light-emitting diodes, or other types of light-emitting devices. In an example embodiment, the light-emitting devices could include InGaAs/GaAs laser diodes configured to emit light at a wavelength around 903 nanometers. Other emission wavelengths are contemplated. In some embodiments, the light-emitting devices could include at least one of: a laser diode, a laser bar, or a laser stack. Furthermore, the light-emitting devices could be configured to provide light pulses between approximately 1-10 nanoseconds in duration. Other light pulse durations are possible.

Additionally or alternatively, the light-emitting devices of LIDAR sensor(s) 120 may include one or more master oscillator power amplifier (MOPA) fiber lasers. Such fiber lasers may be configured to provide light pulses at or around 1550 nanometers and may include a seed laser and a length of active optical fiber configured to amplify the seed laser light to higher power levels. However, other types of light-emitting devices, materials, and emission wavelengths are possible and contemplated.

In some embodiments, the respective light-emitting devices of LIDAR sensor(s) 120 could be configured to emit light into an environment of the vehicle 110 along a plurality of emission vectors toward respective target locations so as to provide a desired resolution. In such scenarios, the light-emitting devices of LIDAR sensor(s) 120 could be operable to emit light along the plurality of emission vectors such that the emitted light interacts with an external environment of the system 100.

The respective emission vectors could include an azimuthal angle and/or an elevation angle (and/or corresponding angular ranges) with respect to a heading or location of the vehicle 110. In some embodiments, light emitted by the LIDAR sensor(s) 120 could be directed along the respective emission vectors by adjusting a rotational mount and/or a moving mirror. Other ways to adjust an emission vector of the light emitted by the LIDAR sensor(s) 120 are contemplated within the context of the present disclosure.

As an example, the LIDAR sensor(s) 120 could include at least one substrate. The at least one substrate may be disposed along one or more a vertical planes. In such a scenario, the plurality of emission vectors may be defined with respect to a horizontal plane. Furthermore, as an example, the at least one substrate may be oriented vertically within a housing configured to rotate about a rotational axis, which may itself be substantially vertical. In such scenarios, the light-emitting devices of LIDAR sensor(s) 120 could be coupled to the housing. The housing is configured to rotate about a rotational axis. In an example embodiment, the housing could rotate such that the light-emitting devices of LIDAR sensor(s) 120 could provide 360 degree azimuthal scanning.

Additionally or alternatively, the light emitting devices of LIDAR sensor(s) 120 could emit light toward a movable mirror. By adjusting an orientation of the movable mirror, the emission vector of the light could be controllably modified. It will be understood that many different physical and optical techniques may be used to direct light toward a given target location. All such physical and optical techniques for adjusting an emission vector of light are contemplated herein.

The system 100 could additionally or alternatively include at least one radar sensor 130 coupled to the vehicle 110. Generally, the radar sensor(s) 130 could include one or multiple antenna arrays that may take the form of a single-input single-output (SISO), single-input, multiple-output (SIMO), multiple-input single-output (MISO), multiple-input multiple-output (MIMO), and/or synthetic aperture radar (SAR) radar antenna architecture.

In some embodiments, the radar sensor(s) 130 could be configured to actively estimate distances to environmental features by emitting radio signals and detecting returning reflected signals. Distances to radio-reflective features can be determined according to the time delay between transmission and reception. In an example embodiment, the radar sensor(s) 130 could include, among other possibilities, a frequency modulated continuous wave (FMCW) radar system. Such a radar system could emit a signal that varies in frequency over time, such as a signal with a time-varying frequency ramp, and then relate the difference in frequency between the emitted signal and the reflected signal to a range estimate. Some radar sensor(s) 130 may also estimate relative motion of reflective objects based on Doppler frequency shifts in the received reflected signals.

In some embodiments, the radar sensor(s) 130 can enable a system (e.g., vehicle control system) to detect and potentially identify nearby vehicles, road boundaries, weather conditions, traffic signs and signals, and pedestrians, among other features within the environment surrounding the vehicle 110. For example, a vehicle control system may use radar measurements of aspects of the environment when determining control strategy for autonomous or semi-autonomous navigation. In some embodiments, the radar sensor(s) 130 may assist the vehicle control system to avoid obstacles while also assisting with determining proper paths for navigation.

The radar sensor(s) 130 could include one or more directional antennas. In such a scenario, the directional antennas could be used for the transmission and/or reception of signals to associate each range estimate and/or relative speed estimate with an azimuthal and/or elevation bearing. More generally, directional antennas can also be used to focus radiated energy on a given field of view of interest.

Combining the measured distances and the directional information allows for the surrounding environment features to be mapped.

In an example embodiment, the radar sensor(s) 130 could include a plurality of directional antennas, which may be arranged in a linear array. Additionally or alternatively, the plurality of directional antennas could include a staggered linear antenna array.

A staggered linear antenna array is similar to a linear array, but includes one or more antennas offset from a centerline of the array. Particularly, rather than utilizing multiple radar units arranged at different orientations and complex processing to align measurements to form a 3D representation of an environment, a radar unit configured with a staggered linear array of antennas may capture measurements that can enable a system to extract elevation information in addition to position and orientation information. As a result, a radar system that uses a staggered linear array radar unit can determine a 3D point cloud representative of an environment without requiring multiple radar units measuring the same region from different orientations.

In some embodiments, the radar antenna architecture may include a plurality of "dual open-ended waveguide" (DOEWG) antennas. In some examples, the term "DOEWG" may refer to a short section of a horizontal waveguide channel plus a vertical channel that splits into two parts, where each of the two parts of the vertical channel includes an output port configured to radiate at least a portion of electromagnetic waves that enter the antenna. Additionally, a plurality of DOEWG antennas may be arranged into an antenna array, such as a staggered linear array of transmission and/or reception antennas with one or more of the antennas offset.

Example antenna architectures may include, for example, multiple metal layers (e.g., aluminum plates) that can be machined with computer numerical control (CNC), aligned properly, and joined together. The first metal layer may include a first half of an input waveguide channel, where the first half of the first waveguide channel includes an input port that may be configured to receive electromagnetic waves (e.g., 77 GHz millimeter waves) into the first waveguide channel. The first metal layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The waveguide antenna elements and/or the waveguide output ports may be rectangular in shape, in some embodiments. In some alternative embodiments, the waveguide antenna elements and/or the waveguide output ports may be circular in shape. Other shapes are also possible.

In example embodiments, each of a plurality of radar sensors 130 could be arranged at different locations along and/or within a body of the vehicle 110. For example, four radar sensors could be mounted on an exterior surface of the vehicle 110. The four radar sensors could be oriented along a front, rear, right, and left side of the vehicle 110. Other arrangements of radar sensor(s) 130 are contemplated. For example, the radar sensor(s) 130 could be arranged proximate to one or more corners of the vehicle 110 at approximately a 45 degree azimuthal angle with respect to a longitudinal axis of the vehicle 110. It will be understood that other orientations of the radar sensor(s) 130 are possible. For example, the radar sensor(s) 130 could be arranged at azimuthal angles other than 45 degrees with respect to a longitudinal axis of the vehicle 110.

System 100 could include at least one other sensor(s) 140. In some embodiments, the other sensor(s) 140 could include a Global Positioning System (GPS), an Inertial Measurement Unit (IMU), a temperature sensor, a speed sensor, a camera, or a microphone. Other types of sensors could be included in system 100. In such scenarios, receiving the information indicative of the operating context of the vehicle could include receiving at least a portion of the information from the one or more other sensors.

System 100 includes a communication interface 160. The communication interface 160 could include, without limitation, one or more wired and/or wireless communication links that connect two or more devices. The communication interface 160 could include a physical link. Alternatively or additionally, the communication interface 160 could include a logical link that utilizes one or more physical links. The communication interface 160 could include, but need not be limited to, communication links utilized in computer networks, the Internet, cloud computing networks, or other network types.

The communication interface 160 may include one or more wireless transmitters and one or more receivers that may communicate with other external or internal devices. For example, communication interface 160 may include one or more transceivers for communicating with a user's device, other vehicles, and roadway elements (e.g., signs, traffic signals), among other possible entities. As such, communication interface 160 may include one or more vehicular communication systems for facilitating communications, such as dedicated short-range communications (DSRC), radio frequency identification (RFID), and other proposed communication standards directed towards intelligent transport systems.

System 100 includes a controller 150. In some embodiments, the controller 150 could include an on-board vehicle computer, an external computer, or a mobile computing platform, such as a smartphone, tablet device, personal computer, wearable device, etc. Additionally or alternatively, the controller 150 can include, or could be connected to, a remotely-located computer system, such as a cloud server network. In an example embodiment, the controller 150 may be configured to carry out some or all of the operations, method blocks, or steps described herein.

The controller 150 may include one or more processors 152 and at least one memory 154. The processor 152 may include, for instance, a microprocessor, an application-specific integrated circuit (ASIC), or a field-programmable gate array (FPGA). Other types of processors, circuits, computers, or electronic devices configured to carry out software instructions are contemplated herein.

The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

Figure 2:
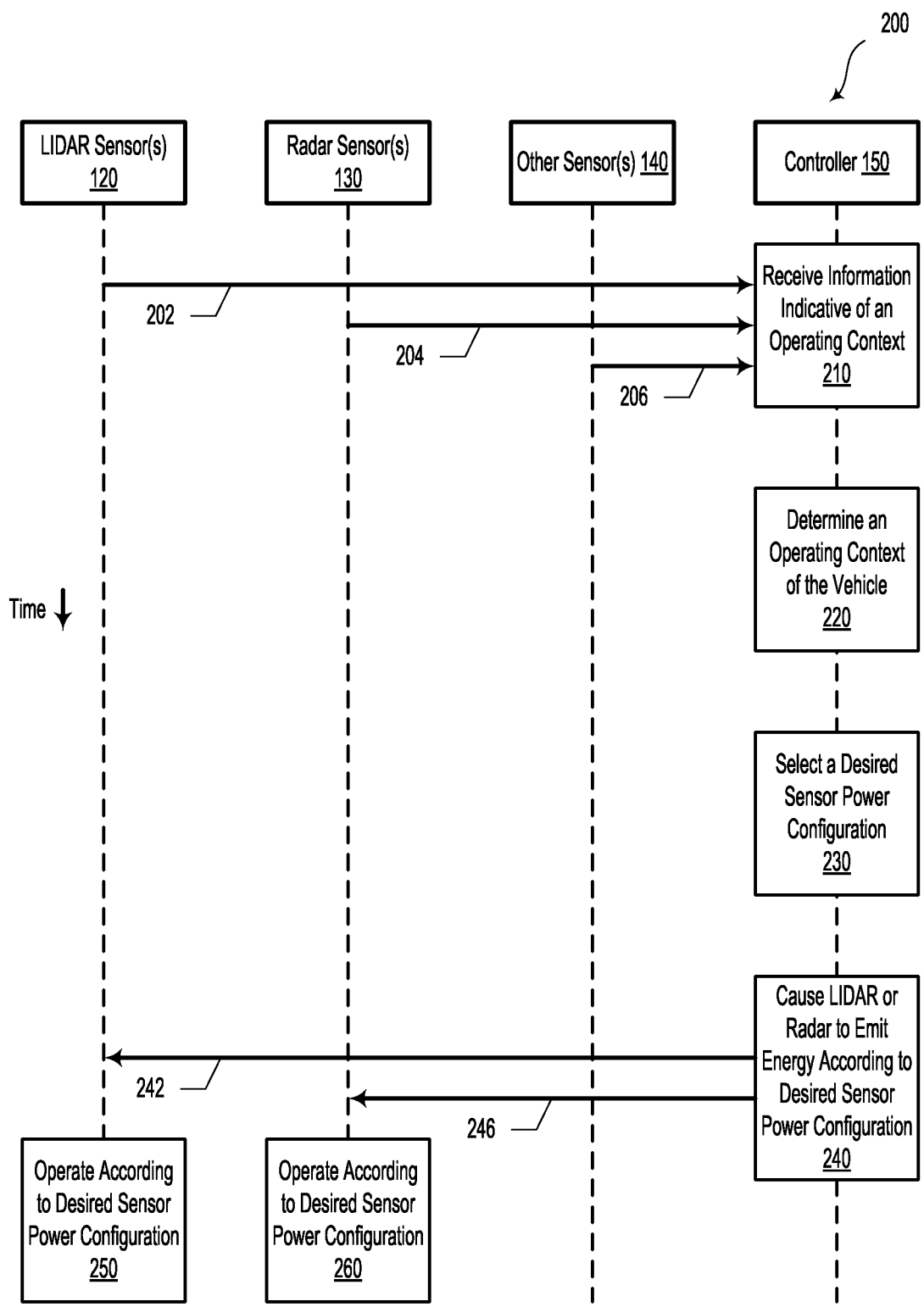
FIG. 2 illustrates several operations of a system, according to example embodiments.

The one or more processors 152 of controller 150 may be configured to execute instructions stored in the memory 154 so as to carry out various operations 200 described herein and as illustrated and described in reference to FIG. 2. While FIG. 2 illustrates several operations 200 of the system 100, other operations are possible and contemplated herein.

The operations 200 illustrated and described with regard to FIG. 2 could be carried out, at least in part, by the controller 150, LIDAR sensor(s) 120, radar sensor(s) 130, other sensor(s) 140, and/or other elements of system 100 and vehicle 110. Furthermore, while the operations 200 are described as occurring in a certain order, it will be understood that alternative combinations, orders, and/or timing patterns are possible and contemplated.

The controller 150 could carry out operation 210, which includes receiving information indicative of an operating context of the vehicle. In some embodiments, the controller 150 could receive LIDAR sensor data 202 from the LIDAR sensor(s) 120. Additionally or alternatively, the controller 150 could receive radar sensor data 204 from the radar sensor(s) 130. Yet further, the controller 150 could receive other sensor data 206 from the other sensor(s) 140.

In an example embodiment, the various forms of sensor data (e.g., LIDAR sensor data 202, radar sensor data 204, and/or other sensor data 206) could include, for example, information about a location of the vehicle 110, a heading of the vehicle 110, a current speed of the vehicle 110, a desired route of the vehicle 110, or other information about the vehicle 110.

The sensor data 202, 204, and 206 could additionally or alternatively include information about objects or element within the environment of the vehicle 110. For example, the sensor data 202, 204, or 206 could include information about other vehicles, pedestrians, buildings, roadways, and/or other objects in the environment of the vehicle 110.

In some example embodiments, receiving the information indicative of the operating context of the vehicle could include receiving at least a portion of the information from a map. In such scenarios, the map could include at least one of: street location information, street type information, predicted traffic information, real-time traffic information, real-time obstacle information, previous camera information, previous LIDAR information, or previous radar information.

Yet further, receiving the information indicative of the operating context of the vehicle could include receiving information indicative of at least one of: a current time of day, a current sun position, local weather conditions, a current environmental temperature, or a current internal hardware temperature.

In some embodiments, the information indicative of the operating context of the vehicle could include at least one of: position data, speed data (current and/or anticipated speed), future position, planned trajectory, LIDAR sensor data, or radar sensor data received from another vehicle. In such a scenario, the desired sensor power configuration could be based, at least in part, on the LIDAR sensor data or radar sensor data received from the other vehicle.

Additionally or alternatively, the information indicative of the operating context of the vehicle could include at least one of: traffic light state, traffic light schedule, sign state, traffic speed, construction status, LIDAR sensor data, or radar sensor data received from an infrastructure source. In such examples, the desired sensor power configuration could be further based, at least in part, on the LIDAR sensor data or radar sensor data received from the infrastructure source.

The controller 150 and/or another computing device could carry out operation 220, which includes determining the operating context of the vehicle 110 based on the received information. The operating context of the vehicle 110 could include, among other possibilities, a location of the vehicle 110 (e.g., GPS coordinates), a current roadway type (e.g., surface street, highway, on/off-ramp, etc.), a speed of the vehicle 110, a planned route of the vehicle 110, locations of objects in the environment of the vehicle 110, positions of other vehicles, anticipated or known routes of other vehicles, traffic density, average speed of other vehicles along current or adjacent roadway, weather conditions, time of day, presence of emergency vehicles, roadway construction, etc. It will be understood that the operating context of the vehicle could be determined based on other types of information.

For example, some operating contexts could include descriptions such as: "weekday morning highway commuter traffic," "approaching divided highway for planned unprotected left turn," "emergency vehicle approaching from behind," "merging onto highway from on-ramp," "nighttime surface street with ice and snow on roadway," "weekend scenic route," etc. It will be understood that many other types of operating contexts are possible and contemplated herein.

Controller 150 and/or another computing device could carry out operation 230, which includes selecting, from a plurality of sensor power configurations, a desired sensor power configuration based on the operating context of the vehicle 110. In some embodiments, the plurality of sensor power configurations could include LIDAR operating parameters. In such scenarios, the LIDAR operating parameters could include at least one of: enabled LIDAR unit(s), dynamic sector angle ranges, sector-based power per light pulse, light pulse rate, or LIDAR scan rate, among other possibilities.

Additionally or alternatively, the plurality of sensor power configurations could include radar operating parameters. In such scenarios, the radar operating parameters could include at least one of: an identification of enabled radar unit(s), selected emitters per enabled radar unit, beamforming direction, energy per radar pulse, radar beam shape, radar pulse bandwidth, radar pulse duration, radar pulse repetition frequency, number of radar pulses per coherent processing interval, or wait time between adjacent coherent processing intervals, among other possibilities.

Other sensor power configurations could include ways in which to reduce or otherwise adjust radar signal processing parameters of the radar sensor system and/or object data derived therefrom. For example, the signal processing adjustments could include limiting the object data processed to that having a corresponding range between a first range threshold and a second range threshold value. In another example, the signal processing adjustments could include limiting the object data processed to that corresponding to objects having a velocity and/or movement vector within a target velocity range and/or within a target movement vector angle range.

Yet further, the processed object data could be limited to that having a corresponding azimuthal and/or elevation angle range. Additionally or alternatively, some object data may be processed at varying degrees of resolution. That is, object data from a peripheral or secondary scanning zone could be processed at a first resolution (e.g., low resolution), while object data from a primary scanning zone could be processed at a second resolution (e.g., high resolution). Furthermore, some the object data could be selectively processed in various processing modes. For example, object data corresponding to a first scanning zone could be processed according to a synthetic aperture radar processing mode while object data corresponding to a second scanning zone could be processed according to a standard radar processing mode. Other special processing modes are possible and contemplated herein.

Among other variations, the plurality of sensor power configurations could include respective priority sectors that could be appropriate for one or more operating contexts of the vehicle. For example, high priority sectors could correspond to spatial locations, zones, azimuthal ranges, elevation ranges, two-dimensional areas or three-dimensional volumes of greater relative interest during a given operating context of the vehicle 110. For example, high priority sectors could include spatial regions that include pedestrians, other vehicles, buildings, or other obstacles.

Low priority sectors could include spatial locations and/or zones that do not include objects or could include areas from which hazards are not predicted to arise. In some embodiments, low priority sectors could include spatial volumes or areas that correspond to relatively lower risk sectors in the environment of the vehicle. Priority sectors are described in further detail with regard to FIGS. 4A-4D and elsewhere herein.

Operation of LIDAR sensors and/or radar sensors could be adjusted dynamically based on a priority of a given sector. For example, relatively low priority sectors could be scanned with lower power per light pulse and/or with less radar energy as compared to high priority sectors. In an example embodiment, low priority sectors could be scanned with one-half or one-quarter the photon flux and/or radar energy as that of high priority sectors. Other power adjustments based on sector priority are contemplated and possible.

Additionally or alternatively, low priority sectors could be scanned less frequently than that of higher priority sectors. That is, in some embodiments, low priority sectors could be scanned at one-half or one-quarter the scanning frequency applied to higher priority sectors. Other scanning frequency adjustments based on sector priority are contemplated and possible.

Yet further, low priority sectors could be scanned according to a lower spatial resolution as that of higher priority sectors. In other words, low priority sectors could be scanned such that the emitted light pulses and/or radar energy provide a minimum spatial resolution that is twice or four times that of higher priority sectors. Other spatial resolution adjustments based on sector priority are possible and contemplated.

As a further embodiment, the plurality of sensor power configurations could include directing LIDAR and/or radar sensor power toward a specific elevation range based on a change in road grade. That is, if a vehicle is traveling on level ground and comes to a rising hill, the sensor power may be directed further upward than in flat-ground driving scenarios. Likewise, if the approaching road grade is changing negatively, the sensor power may be directed further downward than in normal flat-ground driving scenarios.

Controller 150 or another computing device could carry out operation 240, which includes causing at least one of: the at least one LIDAR sensor 120 to emit light pulses according to the desired sensor power configuration (e.g., operation 250) or the at least one radar sensor 130 to emit radar energy according to the desired sensor power configuration (e.g., operation 260). As an example, controller 150 could provide one or more instructions 242 to the LIDAR sensor(s) 120 based on the desired sensor power configuration. Additionally or alternatively, controller 150 could provide one or more instructions 246 to the radar sensor(s) 130 based on the desired sensor power configuration.

Figure 3:
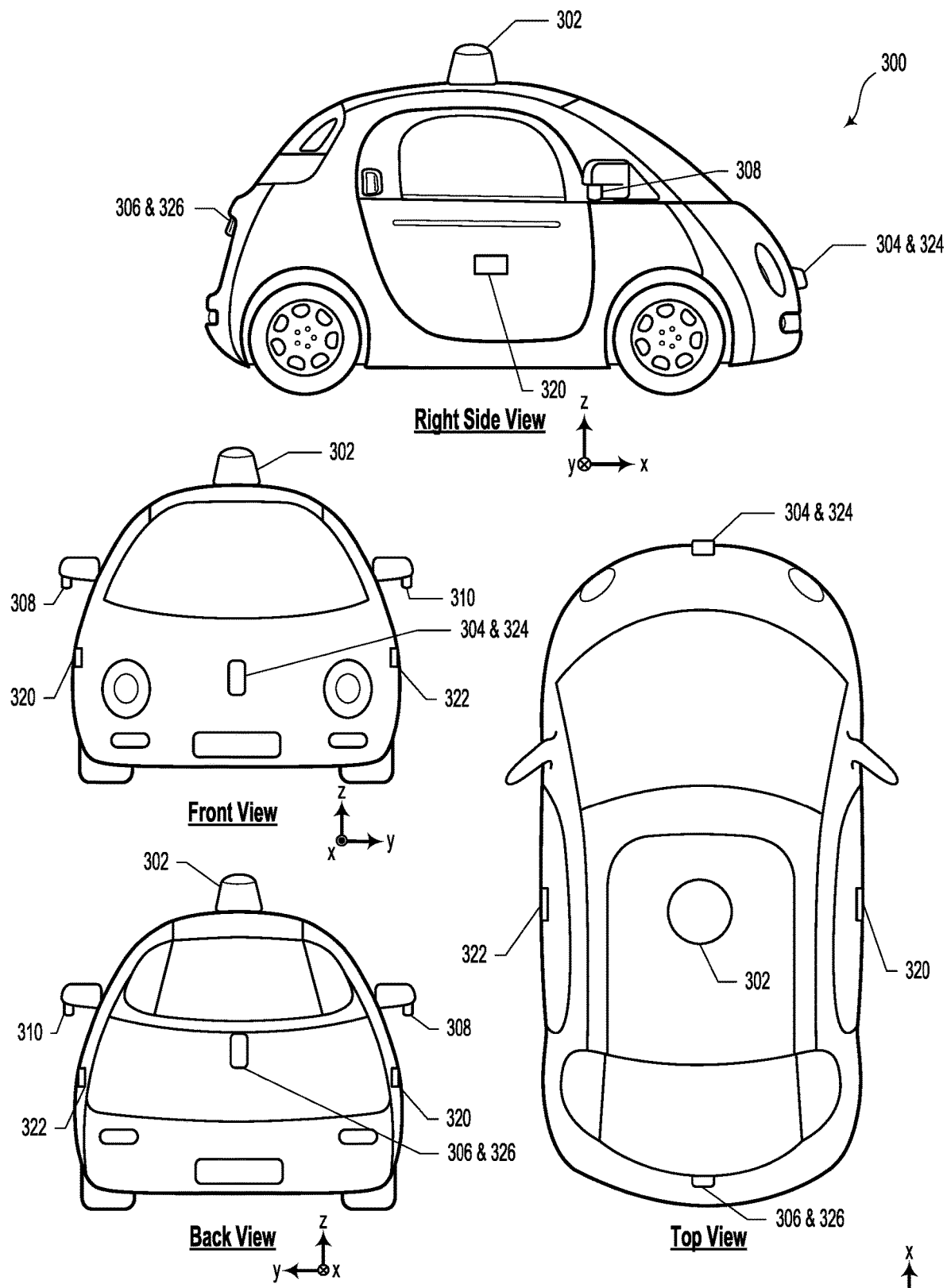
FIG. 3 illustrates a vehicle, according to an example embodiment.

FIG. 3 illustrates a vehicle 300, according to an example embodiment. The vehicle 300 may include one or more sensor systems 302, 304, 306, 308, 310, 320, 322, 324, and 326. In some examples, the one or more sensor systems 302, 304, 306, 308, and 310 could include LIDAR sensor units that could be similar or identical to the LIDAR sensor(s) 120. As an example, sensor systems 302, 304, 306, 308, and 310 could include LIDAR sensors having a plurality of light-emitter devices arranged over a range of angles with respect to a given plane (e.g., the x-y plane).

One or more of the sensor systems 302, 304, 306, 308, and 310 may be configured to rotate about an axis (e.g., the z-axis) perpendicular to the given plane so as to illuminate an environment around the vehicle 300 with light pulses. Additionally or alternatively, one or more of the sensor systems 302, 304, 306, 308, and 310 could include a movable mirror so as to direct emitted light pulses in the environment of the vehicle 300. Based on detecting various aspects of reflected light pulses (e.g., the elapsed time of flight, polarization, etc.), information about the environment may be determined as described herein.

In an example embodiment, sensor systems 302, 304, 306, 308, and 310 may be configured to provide respective point cloud information that may relate to physical objects within the environment of the vehicle 300. While vehicle 300 and sensor systems 302 and 304 are illustrated as including certain features, it will be understood that other types of systems are contemplated within the scope of the present disclosure.

As an example, an example embodiment may include a transmit block of a LIDAR device having a plurality of light-emitter devices. Each light-emitter device of the plurality of light-emitter devices is configured to emit light pulses along a respective beam elevation angle. The respective beam elevation angles could be based on a reference angle or reference plane, as described elsewhere herein. In some embodiments, the reference plane may be based on an axis of motion of the vehicle or another axis with respect to the vehicle.

While certain description and illustrations herein describe systems with multiple light-emitter devices, LIDAR systems with fewer light-emitter devices (e.g., a single light-emitter device) are also contemplated herein. For example, light pulses emitted by a laser diode may be controllably directed about an environment of the system. The angle of emission of the light pulses may be adjusted by a scanning device such as, for instance, a mechanical scanning mirror, scanning optical element, and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment.

In some embodiments, sensor systems 302, 304, 306, 308, and 310 could include a receiver block. For example, the receiver block may be configured to provide information indicative of interactions between the emitted light and the external environment. In such a scenario, the receiver block can include a device configured to receive at least a portion of the light emitted from the plurality of light-emitter devices so as to correlate a received light pulse with an object in the environment of system 100 and/or vehicle 110.

The receiver block may include a plurality of light-detector devices. In such scenarios, the plurality of light-detector devices could be configured to detect light having a wavelength of at least one of: 1550 nm, 903 nm, or 780 nm. Other wavelengths are possible and contemplated herein. In some embodiments, the light-detector devices could include at least one of: an avalanche photodiode, a single photon avalanche detector (SPAD), or a silicon photomultiplier (SiPM). In further embodiments, the light-detector devices may include a plurality of InGaAs photodetectors. Other types of photodetectors are possible and contemplated.

In an example embodiment, the one or more sensor systems 320, 322, 324, and 326 could include radar sensor units that could be similar or identical to the radar sensor(s) 130 illustrated and described in reference to FIGS. 1 and 2.

In some embodiments, sensor systems 302, 304, 306, 308, and 310 (e.g., the LIDAR sensor(s) 120) and sensor systems 320, 322, 324, and 326 (e.g., the radar sensor(s) 130) could be configured to sense objects over a plurality of sectors that could each include an azimuthal angle range, an elevation angle range, and/or a spatial resolution. While sensor systems 304/324 and 306/326 are illustrated as being collocated, it will be understood that other sensor arrangements are possible and contemplated. Furthermore, while certain locations and numbers of sensor systems are illustrated in FIG. 3, it will be understood that different mounting locations and/or different numbers of the various sensor systems are contemplated.

Each of the radar sensor(s) 130 could include a plurality of directional antennas (e.g., four antennas). In such a scenario, each directional antenna could emit into a 15-20 degree wide sector. In some embodiments, the plurality of sectors could be spatially non-overlapping. Alternatively, the plurality of sectors could partially or fully overlap. Emission of radio waves via the directional antennas of the radar sensor(s) 130 could be independently controlled so as to direct relatively more or relatively less power into a given sector.

In some embodiments, one or more of the radar sensors 130 could include a phased array radar. That is, the radar sensors 130 could include an array of antennas configured to form a beam of radio waves that can be steered within a controllable range of different directions without physically moving the antennas. Namely, by controlling a phase shift between the respective antennas of the antenna array, a phase front direction could be adjusted so as to "steer" a radar beam at discrete directions within a given environment.

Similarly, the LIDAR sensor(s) 120 could be configured to emit light into a respective plurality of spatial sectors. Accordingly, the LIDAR sensor(s) 120 could be controlled so as to direct relatively more or relatively less optical power into a given sector. For example, the average power per light pulse, spatial resolution, and/or pulse rate could be dynamically adjusted so efficiently direct a greater proportion of optical power toward one or more high priority sectors and a lower proportion of optical power (including zero power) toward one or more low priority sectors.

In some embodiments, within the context of the LIDAR sensor(s) 120, the spatial resolution could include a target resolution at a given distance away from the system 100. For example, the desired resolution may include a vertical resolution of 7.5 centimeters at 25 meters from the system 100 and/or between adjacent target locations along a horizontal ground plane, whichever is closer. Other desired resolutions, both along a two-dimensional surface and within three-dimensional space, are possible and contemplated herein.

FIG. 4A-4D illustrate various sensing scenarios 400, 430, 450, and 480. In each case, for purposes of clarity, the sensing scenarios 400, 430, 450, and 480 may illustrate only a subset of possible spatial sectors and sensor profiles/ranges. It will be understood that other spatial sectors are possible and contemplated within the scope of the present disclosure. Furthermore, it will be understood that the sensing scenarios 400, 430, 450, and 480 may illustrate only single "snapshots" in time and that spatial sectors and sensor profiles/ranges could be dynamically adjusted so as to periodically or continuously change based on, among other factors, a dynamically-changing operating context of the vehicle 300.

Furthermore, some illustrations and descriptions herein relate to driving on the right-hand side of the road, for example as under driving laws in some jurisdictions (e.g., the United States of America). However, it will be understood that similar or identical descriptions will apply to jurisdictions that drive on the left-hand side of the road.

Figure 4A:
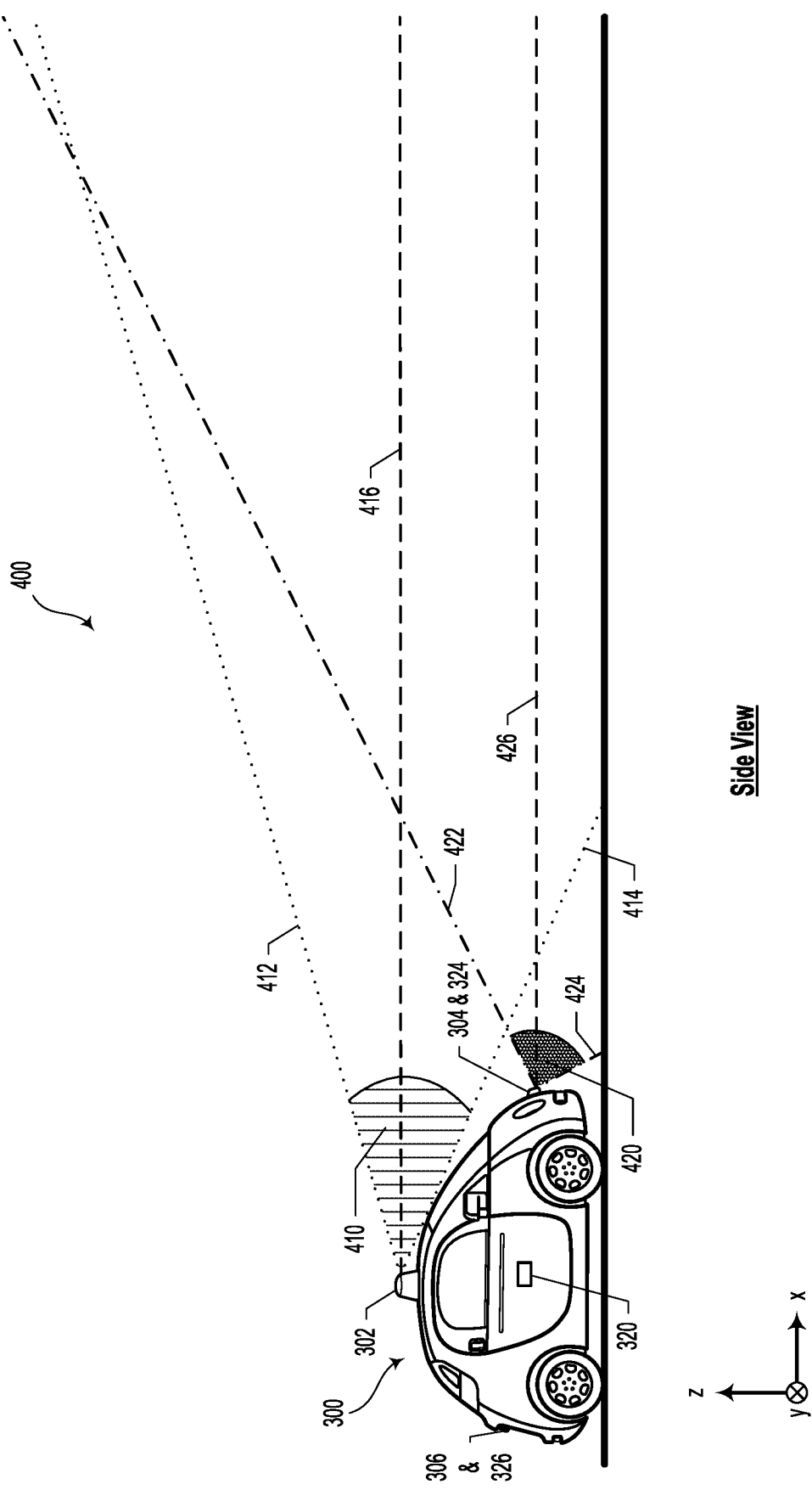
FIG. 4A illustrates a sensing scenario, according to an example embodiment.

FIG. 4A illustrates a side view of vehicle 300 in a sensing scenario 400, according to an example embodiment. Accordingly, it will be understood that the description below may apply to other sensor systems of the vehicle 300. In such a scenario, sensor system 302 may be configured to emit light pulses into an environment of the vehicle 300 over a spatial sector 410 between a maximum elevation angle 412 and a minimum elevation angle 414. The spatial sector 410 could correspond to a first azimuthal angle 416. That is, in some embodiments, spatial sector 410 could be directionally oriented along the first azimuthal angle 416.

In some embodiments, sensor system 302 may include a plurality of light-emitter devices that are arranged in a non-linear elevation angle distribution. That is, to achieve a desired vertical beam resolution, the plurality of light-emitter devices of sensor system 302 may be arranged over beam elevation angles that include heterogeneous elevation angle differences between adjacent beams. In some embodiments, at least a portion of sensor system 302 could be configured to rotate about a rotational axis (e.g., the z-axis) so as to provide light pulses over a range of azimuthal angles.

As a further example, sensor system 304 may be configured to emit light pulses into an environment of the vehicle 300 over a spatial sector 420, which may be defined between a maximum elevation angle 422 and a minimum elevation angle 424. In some embodiments, a plurality of light-emitter devices of sensor system 304 may illuminate the environment about the vehicle 300 with a non-linear elevation angle distribution. To provide a desired vertical beam resolution, the plurality of light-emitter devices of sensor system 304 may be arranged over a set of beam elevation angles that include heterogeneous differences in elevation angle between adjacent beams. The spatial sector 420 could correspond to a second azimuthal angle 426. That is, in some embodiments, spatial sector 420 could be directionally oriented along the second azimuthal angle 426.

In some embodiments, sensor system 324 could be configured to emit radio waves into the environment of the vehicle 300 over some of, or the entire, spatial sector 420. However, the sensor system 324 need not have the same emission profile as that of sensor system 304. Furthermore, as described herein, sensor system 324 could include a plurality of directional antennas, each of which could be individually controlled so as to emit radio waves into different spatial sectors that could have different azimuthal and/or elevation angle ranges.

Figure 4B:
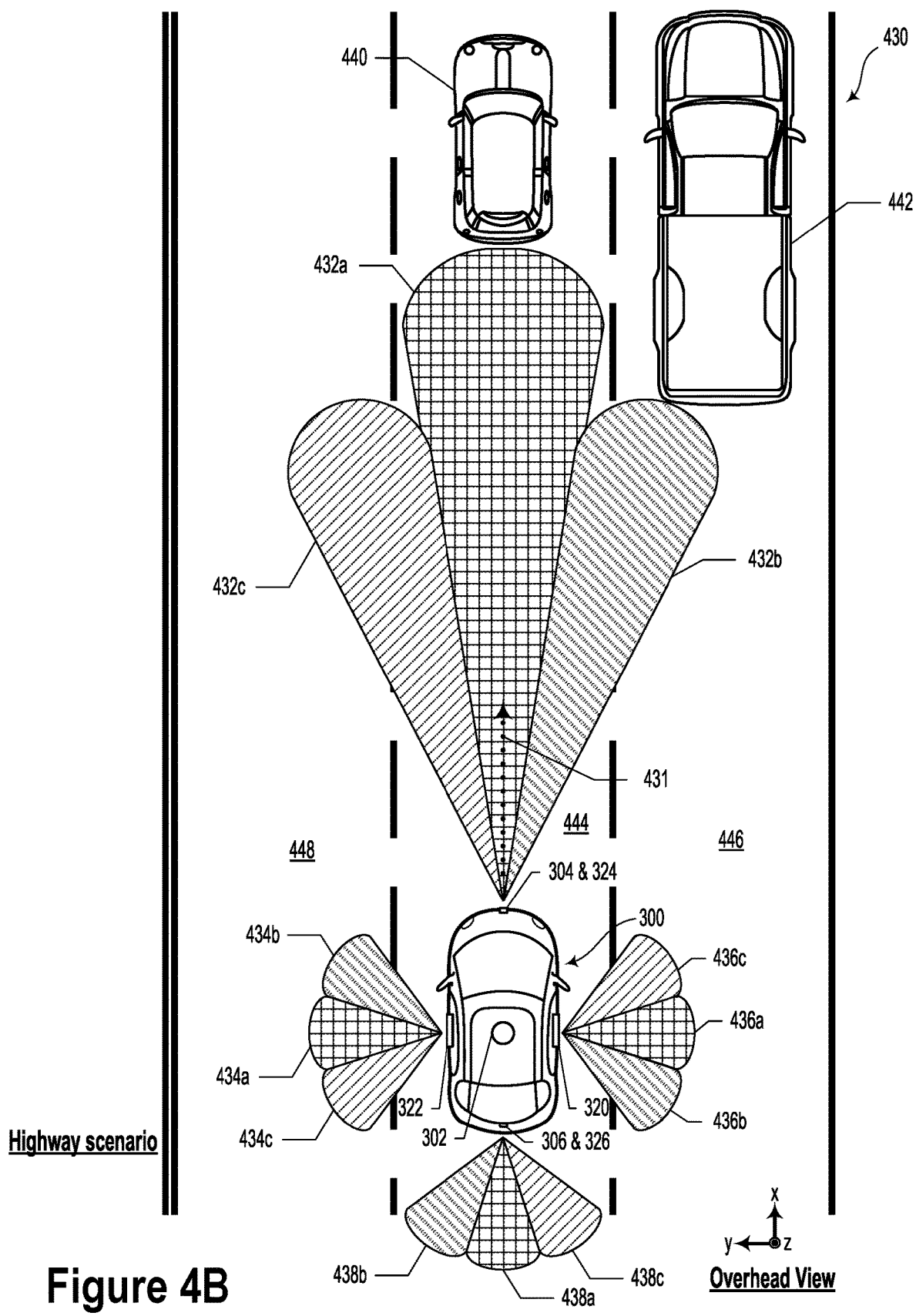
FIG. 4B illustrates a sensing scenario, according to an example embodiment.

FIG. 4B illustrates an overhead view of vehicle 300 in a sensing scenario 430, according to an example embodiment. Sensing scenario 430 could include a highway driving scenario in which vehicle 300 is traveling along a predetermined route 431 in a middle lane 444 of a three lane portion of roadway, which also includes left lane 448 and right lane 446. Other vehicles 440 and 442 could also be present in the middle lane 444 and right lane 446, respectively.

Under standard highway driving conditions, vehicle 300 could be traveling at a relatively high rate of speed (e.g., 60 miles per hour). In such a scenario, a risk of collision, and corresponding severity of such a collision, may be relatively higher for a forward collision (e.g., due to slowing or stopped traffic ahead of vehicle 300) as compared to side or rear collision (e.g., due to another vehicle side-swiping vehicle 300). That is, the risk of something coming from the sides and rear at long range is lower than that of a risk from frontal collision. As such, spatial sectors facing toward the front of the vehicle 300 may be designated as high priority sectors, while spatial sectors facing the sides and rear of the vehicle 300 could be designated as low priority sectors.

Based on the operating context of sensing scenario 430, controller 150 and/or another computing system could select, from a plurality of possible sensor power configurations, a desired sensor power configuration. Specifically, the desired sensor power configuration could correspond, at least in part, with the priorities assigned to one or more of the spatial sectors. As such, the controller 150 could cause one or more sensor systems 302, 304, 306, 308, 310, 320, 322, 324, and 326 to adjust their respective operating parameters according to the desired sensor power configuration. For example, controller 150 could cause sensor systems 304 and 324 to provide relatively higher sensor power to high priority sectors 432a, 432b, and 432c. That is, in an effort to sense as far into the distance as possible for slowing or stopped traffic, the respective sensor systems could provide maximum or relatively high power to the high priority sectors.

To the left and right sides of vehicle 300, sensor systems 322 and 320 could provide a relatively lower sensor power to low priority sectors 434a-c and 436a-c, respectively. To the rear of vehicle 300, sensor systems 306 and 326 could provide lower relative sensor power to low priority sectors 438a-c.

In other words, an emission power of the respective sensors could be adjusted based on a contextual risk profile. Such a contextual risk profile could be based on determining from which direction a collision risk is most likely to approach, given a present driving scenario. The contextual risk profile could be based on analysis of historical crash data, traffic patterns, semi- and fully-autonomous vehicle driving standards, applicable laws and/or regulations, and human driver tendencies, among other possibilities. In such a way, sensor emissions and their corresponding power can be more efficiently and effectively deployed within an environment of the vehicle 300 for a given driving context.

Figure 4C:
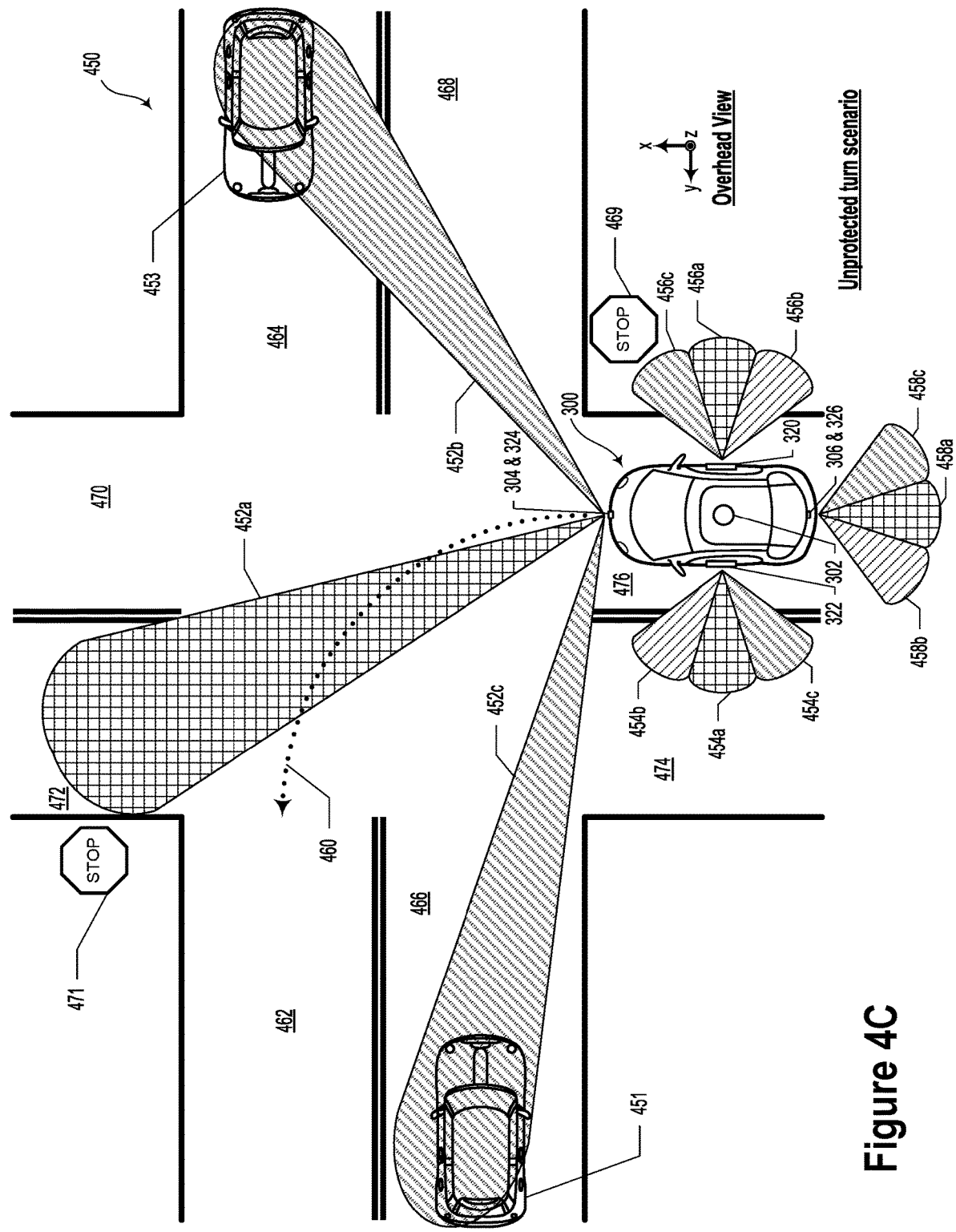
FIG. 4C illustrates a sensing scenario, according to an example embodiment.

FIG. 4C illustrates a vehicle 300 in a sensing scenario 450, according to an example embodiment. Sensing scenario 450 could illustrate an unprotected left turn situation. Namely, vehicle 300 could be stopped at a stop sign 469 at an intersection between roadways 462, 464, 466, 468, 470, 472, 474, and 476. Furthermore, the vehicle 300 could be planning to execute a left hand turn along a predetermined route 460. In such a scenario, the most likely dangers may come from vehicles that could approach from roadway 466 (near left) or roadway 464 (far right), and then possibly from roadway 472 (opposite head on lane subject to stop sign 471).

As such, a high priority status could be attributed to spatial sectors 452a-c and a lower priority could be attributed to the left, right, and rear sides of the vehicle 300, which may correspond to spatial sectors 454a-c, 456a-c, and 458a-c. Based on such priority rankings, the controller 150 or another computing device could select, from a plurality of possible sensor power configurations, a desired sensor power configuration. Specifically, the desired sensor power configuration could correspond, at least in part, with the priorities assigned to the given spatial sectors.

In some embodiments, spatial sectors could be ranked in priority based on a presence or anticipated presence of one or more objects (e.g., other vehicles, pedestrians, roadways, or other obstacles) in the respective sector. For example, spatial sectors 456a-c could be prioritized more highly based on a possible presence of a pedestrian stepping out from a curb or a sidewalk. Optionally or alternatively, upon determining a presence of a pedestrian in a given sector, that sector could be reprioritized (e.g., given a higher priority) to improve the likelihood of continued awareness of the pedestrian.

Correspondingly, controller 150 or another computing device could adjust an operation of sensor systems 304 and/or 324 according to the desired sensor power configuration so as to provide greater emission power into high priority sectors 452a-c. Furthermore, sensor systems 306, 320, 322, and 326 could be operated so as to provide relatively less emission power into the low priority sectors 454a-c, 456a-c, and 458a-c.

Providing greater emission power into high priority spatial sectors could be performed in various ways based on the desired sensor power configuration. For example, the sensor systems could be adjusted to provide higher spatial resolution information about a given spatial sector based on a respective sector priority and/or object type in that sector. As an example, within a high priority spatial sector, the spatial resolution could be increased so as to sense smaller objects at a given distance away from the vehicle 300. That is, the sensor systems could be adjusted to provide higher emission power (e.g., on a per unit volume basis) by increasing the density of light pulses emitted into a given spatial sector. Additionally or alternatively, the sensor systems could be adjusted to provide higher emission power on a per light pulse basis. As such, the higher power light pulses could provide greater sensing range to higher priority spatial sectors, which could include objects located at greater ranges (e.g., further away from vehicle 300).

While FIG. 4C illustrates an unprotected turn scenario, it will be understood that protected turn scenarios (e.g., turns involving stop signs or signals for each roadway) are also contemplated. For example, in a protected turn scenario with traffic signals, priority levels for the given spatial sectors could change dynamically based on a current traffic signal pattern and/or known or predicted traffic signal timing.

Additionally or alternatively, one or more high-priority sectors could be assigned based on a potential risky or dangerous behavior of another vehicle. For example, in an unprotected or protected turn scenario, a high-priority sector may correspond to a direction from which a "red-light runner", distracted driver, or swerving vehicle may approach. For instance, in the case of a protected left turn scenario, a high-priority sector could be assigned so as to scan at a distant range to the right so as to anticipate and avoid another vehicle that might not comply with a stop signal or sign for its lane.

In the case of a four-way stop (e.g., an intersection with stop signs for each roadway), spatial sector priority could be based on an arrival order of vehicles to the intersection, traffic laws, and/or or right-of-way conventions. For example, if two vehicles arrive at a four-way stop at the same time from different directions, the vehicle on the right may be provided the right-of-way in a certain jurisdiction. The priority level of given sectors, and corresponding sensor emission power, could be adjusted accordingly to avoid collisions.

Figure 4D:
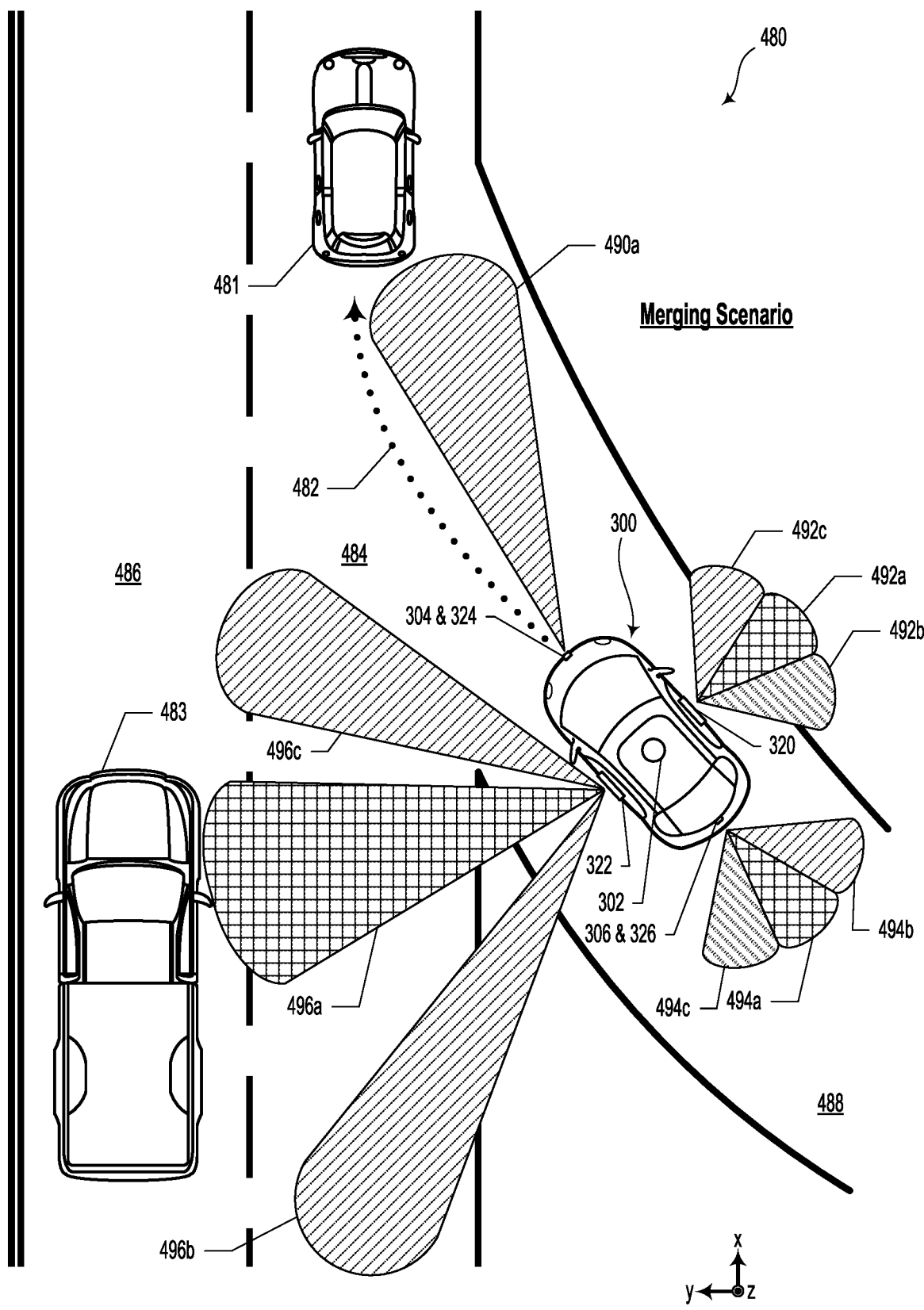
FIG. 4D illustrates a sensing scenario, according to an example embodiment.

FIG. 4D illustrates vehicle 300 in a sensing scenario 480, according to an example embodiment. Sensing scenario 480 could include a merging scenario in which vehicle 300 is planning to execute a merging maneuver from an on-ramp 488 onto a right lane 484 according to a predetermined route 482. Under such circumstances, the driving context may indicate that the greatest risk of collision may come from another vehicle approaching from the rear in right lane 484, another vehicle (e.g., vehicle 483) changing lanes into the right lane 484, or another vehicle (e.g., vehicle 481) that could be stopped or moving slowly in the right lane 484.

As such, the controller 150 and/or another computing device could assign certain priorities to the various spatial sectors in the environment of the vehicle 300. For example, spatial sectors 490a and 496a-c could be assigned a high priority while spatial sectors 494a-c and 492a-c could be assigned a lower priority.

In light of the operating context of the vehicle 300 in sensing scenario 480, the controller 150 may select, from a plurality of sensor power configurations, a desired sensor power configuration. Specifically, the desired sensor power configuration could correspond, at least in part, with the priorities assigned to the given spatial sectors.

Yet further, the controller 150 and/or another computing device could cause the respective sensor systems to emit light pulses according to the desired sensor power configuration (in the case of LIDAR sensors) or to emit radar energy according to the desired sensor power configuration (in the case of radar sensors).

It will be understood that the systems and methods described herein could be applied to other types of sensor systems. For example, the systems and methods could include imaging sensors (e.g., cameras), ultrasonic sensors, Time of Flight (ToF) sensors, etc. Furthermore, the desired sensor power configuration could incorporate various operating modes of these other sensor system types. As such, the present disclosure contemplates adjusting the operation of any of these other types of sensor systems according to the desired sensor power configuration. As a non-limiting example, in response to designating a high priority spatial sector, the controller could cause a camera to capture a high-resolution, high dynamic range (HDR) image, or series of images, of a field of view that includes the high priority spatial sector.

Figure 5A:
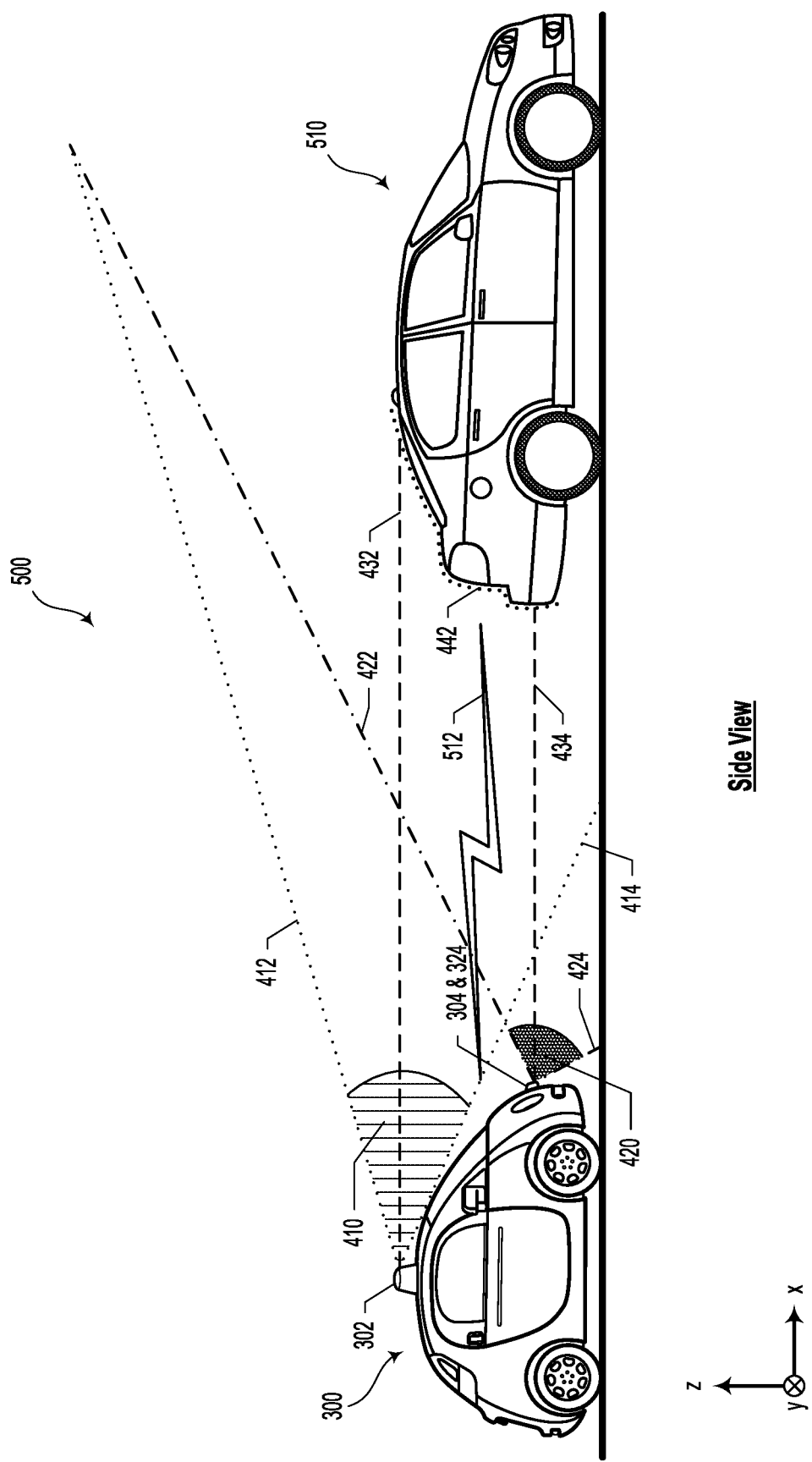
FIG. 5A illustrates a sensing scenario, according to an example embodiment.
Figure 5B:
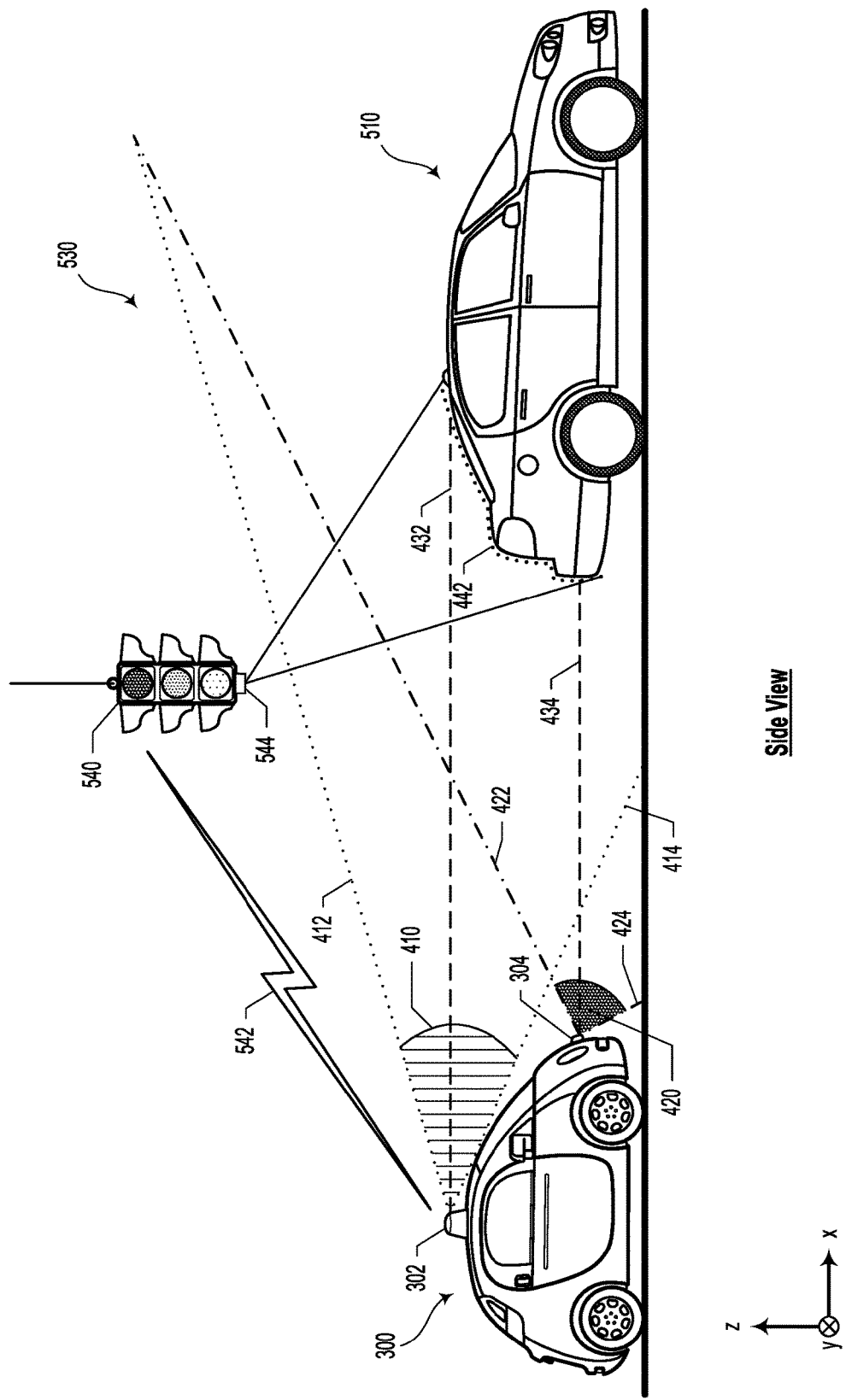
FIG. 5B illustrates a sensing scenario, according to an example embodiment.

FIGS. 5A and 5B illustrated sensing scenarios 500 and 530, in which information about an operating context of vehicle 300 could be received from external sources, such as another vehicle or an infrastructure source.

FIG. 5A illustrates a sensing scenario 500, according to an example embodiment. In sensing scenario 500, vehicle 300 could receive information from another vehicle 510 that could relate to the operating context of the vehicle 300. For example, the other vehicle 510 could provide at least one of LIDAR sensor data or radar sensor data to the vehicle 300 via a wireless communication link 512. Additionally or alternatively, the other vehicle 510 could provide its own GPS location or other operating information (e.g., speed, heading, local traffic information, etc.) to vehicle 300 via the wireless communication link 512.

Based on the information received from the other vehicle 510, the controller 150 could adjust how priorities are assigned to the spatial sectors in the environment of vehicle 300. For example, if the other vehicle 510 is in the same lane as vehicle 300, forward-facing spatial sectors (e.g., spatial sectors 410 and 420) could be assigned a high priority so as to ensure proper identification and registration of surface 442 as the rear of the other vehicle 510. That is, the desired sensor power configuration could be based, at least in part, on the LIDAR sensor data or radar sensor data received from the other vehicle 510.

Additionally or alternatively, in some embodiments and operating contexts, vehicle 300 could be configured to "rely upon" at least some of the LIDAR and/or radar sensor data from the other vehicle 510. For example, in a highway driving scenario, if other vehicle 510 is ahead of, and in the same lane as, vehicle 300, the other vehicle 510 could be in a better unobstructed position to sense far ahead with its sensor systems. As a result, vehicle 300 need not emit high amounts of power toward the front-facing spatial sectors. Rather, in such a scenario, vehicle 300 could reduce its forward emission power to merely sense and follow vehicle 510. As such, vehicle 300 could rely upon the forward-looking sensors of the other vehicle 510 to sense slow-downs and other traffic.

Other ways to efficiently arrange sensing of various spatial sectors shared between multiple vehicles are contemplated. For example, the multiple vehicles could communicate so as to assign the various spatial sectors to a given vehicle so as to reduce or minimize overlap between the spatial sectors that are sensed. Thereafter, by sharing the sensor information via a wireless communication link, the multiple vehicles could obtain sufficient object information, but using much reduced power and radar signal/light emissions. Additionally or alternatively, such coordination between multiple vehicles could help reduce or minimize sensor interference.

FIG. 5B illustrates a sensing scenario 530, according to an example embodiment. In sensing scenario 530, vehicle 300 could receive information from an infrastructure source 540 that could relate to the operating context of the vehicle 300. Examples of infrastructure sources 540 could include fixed sensor systems, such as cameras or LIDAR/radar sensor systems mounted to traffic signals, signs, bridges, buildings, roadways, etc. Infrastructure sources could additionally or alternatively include moving sensor systems, such as systems that could be mounted on a bus, train, aerial vehicle, or another moving platform.

In such an example, the infrastructure source 540 could provide at least one of: traffic light state, traffic light schedule, sign state (e.g., school zone, temporary no turn on red), traffic speed (e.g., notices about traffic speed such as traffic jam ahead), construction status (e.g., closed lanes, lane shifts/changes), LIDAR sensor data, or radar sensor data to the vehicle 300 via a wireless communication link 542. Additionally or alternatively, the infrastructure source 540 could provide its own GPS location or other operating information (e.g., weather, speed, heading, local traffic information, etc.) to vehicle 300 via the wireless communication link 542.

Based on the information received from the infrastructure source 540, the controller 150 could adjust how priorities are assigned to the spatial sectors in the environment of vehicle 300. For example, if the infrastructure source 540 provides LIDAR point cloud information indicative of another vehicle 510, forward-facing spatial sectors (e.g., spatial sectors 410 and 420) of the vehicle 300 could be assigned a high priority so as to ensure proper identification and registration of surface 442 as the rear of the other vehicle 510. That is, the desired sensor power configuration could be based, at least in part, on the LIDAR sensor data or radar sensor data received from the infrastructure source 540.

Additionally or alternatively, the infrastructure source 540 could provide other information to the vehicle 300. For example, the infrastructure source 540 could provide its current light status (green, yellow, red, walk, don't walk, emergency vehicle, etc.) to the vehicle 300. The infrastructure source 540 could provide an anticipated light status, a light schedule, a crosswalk status, a map, or other information about an environment of the infrastructure source 540. Based on the information received from the infrastructure source 540, the vehicle 300 could appropriately adjust its sensor scanning profile.

III. Example Methods

Figure 6:
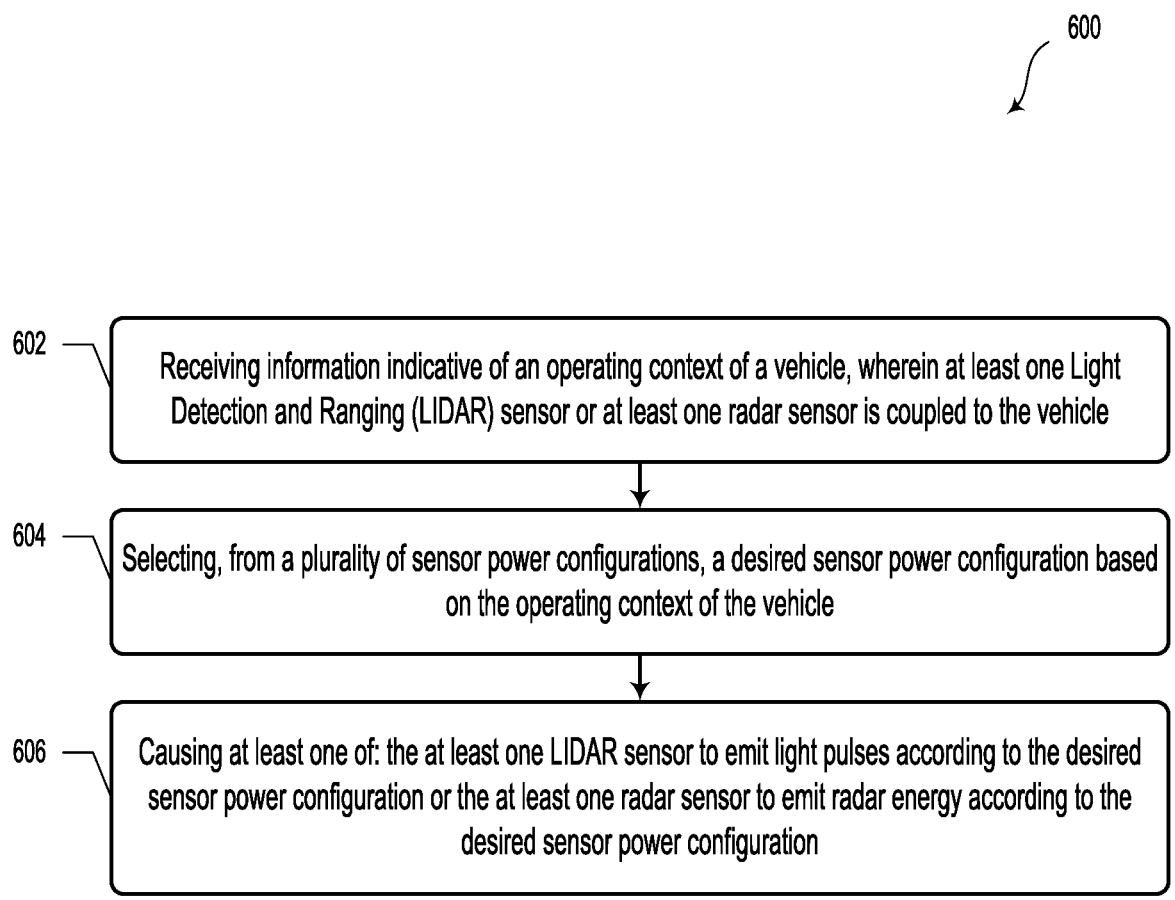
FIG. 6 illustrates a method, according to an example embodiment.

FIG. 6 illustrates a method 600, according to an example embodiment. It will be understood that the method 600 may include fewer or more steps or blocks than those expressly illustrated or otherwise disclosed herein. Furthermore, respective steps or blocks of method 600 may be performed in any order and each step or block may be performed one or more times. In some embodiments, some or all of the blocks or steps of method 600 may be carried out by controller 150, LIDAR sensor(s) 120, and/or radar sensor(s) 130 as illustrated and described in relation to FIG. 1. Furthermore, method 600 may be described, at least in part, by the operations 200, as illustrated in relation to FIG. 2. Yet further, method 600 may be carried out, at least in part, by vehicle 300 as illustrated and described in relation to FIG. 3. Method 600 may be carried out in scenarios similar or identical to scenarios 400, 430, 450, and 480 as illustrated and described in relation to FIGS. 4A-4D. It will be understood that other scenarios are possible and contemplated within the context of the present disclosure.

Block 602 includes receiving information indicative of an operating context of a vehicle. As described elsewhere herein, the vehicle includes at least one Light Detection and Ranging (LIDAR) sensor or at least one radar sensor. Such LIDAR and radar sensors could be coupled to the vehicle.

Block 604 includes selecting, from a plurality of sensor power configurations, a desired sensor power configuration based on the operating context of the vehicle.

Block 606 includes causing at least one of: the at least one LIDAR sensor to emit light pulses according to the desired sensor power configuration or the at least one radar sensor to emit radar energy according to the desired sensor power configuration.

In some embodiments, one or more other sensors are associated with the vehicle. The one or more sensors could include at least one of: a Global Positioning System (GPS), an Inertial Measurement Unit (IMU), a temperature sensor, a speed sensor, a camera, or a microphone. Other types of sensors are contemplated. As described herein, the operating context of the vehicle could be obtained from a time of day, a location, a route, and/or location of other vehicles or pedestrians, among other possibilities. In such scenarios, receiving the information indicative of the operating context of the vehicle could include receiving at least a portion of the information from the one or more sensors.

In some examples, the method 600 receiving the information indicative of the operating context of the vehicle could include receiving at least a portion of the information from a map. Without limitation, the map could include a street map, a topographical map, a waypoint map, a pre-planned route, a GPS location, a plurality of map coordinates, and/or another type of absolute or relative location information with respect to a current or expected location of the vehicle.

Furthermore, the map could include at least one of: street location information, street type information, predicted traffic information, real-time traffic information, real-time obstacle information, previous camera information, previous LIDAR information, or previous radar information.

In some embodiments, receiving the information indicative of the operating context of the vehicle could include receiving information indicative of at least one of: a current time of day, a current sun position, local weather conditions, a current environmental temperature, or a current internal hardware temperature.

In examples, the plurality of sensor power configurations could include LIDAR operating parameters. For instance, the LIDAR operating parameters could include at least one of: a selection and/or identification of enabled LIDAR unit(s), dynamic sector angle ranges, sector-based power per light pulse, light pulse rate, or LIDAR scan rate, among other possibilities.

Additionally or alternatively, the plurality of sensor power configurations could include radar operating parameters. Such radar operating parameters could include at least one of: a selection and/or identification of enabled radar unit(s), selected emitters per enabled radar unit, beamforming direction, energy per radar pulse, radar beam shape, radar pulse bandwidth, radar pulse duration, radar pulse repetition frequency, number of radar pulses per coherent processing interval, or wait time between adjacent coherent processing intervals, among other possibilities. The sensor power configurations could include various radar signal processing parameters, described elsewhere herein.

In some embodiments, receiving information indicative of the operating context of the vehicle could include receiving at least one of LIDAR sensor data or radar sensor data from another vehicle. Accordingly, the desired sensor power configuration could be based on the LIDAR sensor data or radar sensor data received from the other vehicle.

Additionally or alternatively, receiving information indicative of the operating context of the vehicle could include receiving at least one of LIDAR sensor data or radar sensor data from an infrastructure source. In such a scenario, the desired sensor power configuration could be based, at least in part, on the LIDAR sensor data or radar sensor data received from the infrastructure source.

In an example embodiment, an infrastructure source could include a fixed or mobile sensor unit that may be associated with a roadway, intersection, building, or another non-vehicle source. In such a scenario, the sensor unit of the infrastructure source could include one or more of a camera, a LIDAR sensor, a radar sensor, a proximity sensor, and/or another type of sensor. The infrastructure source could provide the sensor data from the sensor unit to the vehicle. Additionally or alternatively, the infrastructure source could provide information about objects in the environment of the sensor unit.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
    a vehicle comprising at least one of: a Light Detection and Ranging (LIDAR) sensor coupled to the vehicle or a radar sensor coupled to the vehicle; and
    a controller, configured to execute instructions so as to carry out operations, the operations comprising:
        receiving information indicative of an operating context of the vehicle;
        selecting, from a plurality of sensor power configurations, a desired sensor power configuration based at least on the operating context; and
        causing at least one of: the at least one LIDAR sensor to emit light pulses according to the desired sensor power configuration and an orientation of the at least one LIDAR sensor, or the at least one radar sensor to emit radar energy according to the desired sensor power configuration and an orientation of the at least one radar sensor.

2. The system of claim 1, further comprising one or more sensors comprising at least one of: the at least one LIDAR sensor, the at least one radar sensor, a Global Positioning System (GPS), an Inertial Measurement Unit (IMU), a temperature sensor, a speed sensor, a camera, or a microphone, and wherein receiving the information indicative of the operating context of the vehicle comprises receiving at least a portion of the information from the one or more sensors.

3. The system of claim 1, wherein receiving the information indicative of the operating context of the vehicle comprises receiving at least a portion of the information from a map.

4. The system of claim 3, wherein the map comprises at least one of: street location information, street type information, street geometry information, location of stop signs, location of stop lights, location of stop lines, predicted traffic information, real-time traffic information, real-time obstacle information, previous camera information, previous LIDAR information, or previous radar information.

5. The system of claim 1, wherein receiving the information indicative of the operating context of the vehicle comprises receiving information indicative of at least one of: a current time of day, a current sun position, local weather conditions, a current environmental temperature, or a current internal hardware temperature.

6. The system of claim 1, wherein the plurality of sensor power configurations comprise LIDAR operating parameters, wherein the LIDAR operating parameters comprise at least one of: enabled LIDAR unit(s), dynamic sector angle ranges, sector-based power per light pulse, light pulse rate, or LIDAR scan rate.

7. The system of claim 1, wherein the plurality of sensor power configurations comprise at least one of: radar operating parameters or radar signal processing parameters, wherein the radar operating parameters comprise at least one of: enabled radar unit(s), selected emitters per enabled radar unit, beamforming direction, energy per radar pulse, radar beam shape, radar pulse bandwidth, radar pulse duration, radar pulse repetition frequency, number of radar pulses per coherent processing interval, or wait time between adjacent coherent processing intervals.

8. The system of claim 1, wherein the information indicative of the operating context of the vehicle comprises at least one of: position data, speed data, future position, planned trajectory, LIDAR sensor data, or radar sensor data received from another vehicle, and wherein the desired sensor power configuration is further based on the information received from the other vehicle.

9. The system of claim 1, wherein the information indicative of the operating context of the vehicle comprises at least one of: traffic light state, traffic light schedule, sign state, traffic speed, construction status, LIDAR sensor data, or radar sensor data received from an infrastructure source.

10. The system of claim 1, wherein the orientation of the at least one LIDAR sensor corresponds to at least one of: an orientation of a movable mirror of the at least one LIDAR sensor, a field of view of the at least one LIDAR sensor, a spatial sector, or a high priority spatial sector, and wherein the orientation of the at least one radar sensor corresponds to at least one of: a beamforming direction, a field of view of the at least one radar sensor, a spatial sector, or a high priority spatial sector.

11. A method comprising:
    receiving information indicative of an operating context of a vehicle, and wherein at least one Light Detection and Ranging (LIDAR) sensor or at least one radar sensor are coupled to the vehicle;
    selecting, from a plurality of sensor power configurations, a desired sensor power configuration based at least on the operating context; and
    causing at least one of: the at least one LIDAR sensor to emit light pulses according to the desired sensor power configuration and an orientation of the at least one LIDAR sensor, or the at least one radar sensor to emit radar energy according to the desired sensor power configuration and an orientation of the at least one radar sensor.

12. The method of claim 11, wherein one or more sensors are associated with the vehicle, wherein the one or more sensors comprise at least one of: the at least one LIDAR sensor, the at least one radar sensor, a Global Positioning System (GPS), an Inertial Measurement Unit (IMU), a temperature sensor, a speed sensor, a camera, or a microphone, and wherein receiving the information indicative of the operating context of the vehicle comprises receiving at least a portion of the information from the one or more sensors.

13. The method of claim 11, wherein the plurality of sensor power configurations comprise LIDAR operating parameters, wherein the LIDAR operating parameters comprise at least one of: enabled LIDAR unit(s), dynamic sector angle ranges, sector-based power per light pulse, light pulse rate, or LIDAR scan rate.

14. The method of claim 11, wherein the plurality of sensor power configurations comprise radar operating parameters, wherein the radar operating parameters comprise at least one of: enabled radar unit(s), selected emitters per enabled radar unit, beamforming direction, energy per radar pulse, radar beam shape, radar pulse bandwidth, radar pulse duration, radar pulse repetition frequency, number of radar pulses per coherent processing interval, or wait time between adjacent coherent processing intervals.

15. The method of claim 11, wherein receiving information indicative of the operating context of the vehicle comprises receiving at least one of: traffic light state, traffic light schedule, sign state, traffic speed, construction status, LIDAR sensor data, or radar sensor data from an infrastructure source, wherein the desired sensor power configuration is further based on the information received from the infrastructure source.

16. The method of claim 11, wherein the operating context further comprises a traffic condition on the current roadway type, and wherein selecting the desired sensor power configuration comprises selecting the desired sensor power configuration based on the traffic condition.

17. The method of claim 11, wherein the operating context further comprises an indication of an other vehicle on the roadway, and wherein selecting the desired sensor power configuration comprises selecting the desired sensor power configuration based on the other vehicle on the roadway.

18. The method of claim 11, wherein the operating context further comprises least a current roadway type of a roadway on which the vehicle is travelling, and wherein selecting the desired sensor power configuration comprises selecting the desired sensor power configuration based on the current roadway type.

19. The method of claim 11, wherein selecting the desired sensor power configuration comprises selecting the desired sensor power configuration based on elevation or aziumuthal angle ranges covered by one or more other sensor systems on the vehicle within the operating context, wherein the operating context of the vehicle comprises at least one of: a turning scenario, a protected turn scenario, or a merging scenario.

20. The method of claim 11, wherein the orientation of the at least one LIDAR sensor corresponds to at least one of: an orientation of a movable mirror of the at least one LIDAR sensor, a field of view of the at least one LIDAR sensor, a spatial sector, or a high priority spatial sector, and wherein the orientation of the at least one radar sensor corresponds to at least one of: a beamforming direction, a field of view of the at least one radar sensor, a spatial sector, or a high priority spatial sector.

* * * * *